(12) United States Patent
Mueller et al.

(10) Patent No.: US 8,995,790 B2
(45) Date of Patent: Mar. 31, 2015

(54) IMAGE PROCESSING METHOD IN MICROSCOPY

(75) Inventors: Daniel Carl Mueller, Eindhoven (NL); Dirk Leo Joep Vossen, Eindhoven (NL); Bas Hulsken, Nijmegen (NL)

(73) Assignee: Koninklijke Philips N.V., Eindhoven (NL)

(*) Notice: Subject to any disclaimer, the term of this patent is extended or adjusted under 35 U.S.C. 154(b) by 175 days.

(21) Appl. No.: 13/703,513

(22) PCT Filed: Jun. 10, 2011

(86) PCT No.: PCT/IB2011/052546
§ 371 (c)(1),
(2), (4) Date: Dec. 12, 2012

(87) PCT Pub. No.: WO2011/158162
PCT Pub. Date: Dec. 22, 2011

(65) Prior Publication Data
US 2013/0089249 A1    Apr. 11, 2013

(30) Foreign Application Priority Data
Jun. 15, 2010   (EP) .................................... 10305643

(51) Int. Cl.
*G06K 9/32* (2006.01)
*G06K 9/00* (2006.01)
*G06T 3/00* (2006.01)

(52) U.S. Cl.
CPC ............ *G06K 9/0014* (2013.01); *G06T 3/0068* (2013.01); *G06T 2200/24* (2013.01); *G06T 2207/10056* (2013.01); *G06T 2207/20016* (2013.01); *G06T 2207/20104* (2013.01)
USPC ........... 382/294; 382/128; 382/133; 382/240; 382/276; 382/293; 348/79

(58) Field of Classification Search
None
See application file for complete search history.

(56) References Cited

U.S. PATENT DOCUMENTS

| | | | |
|---|---|---|---|
| 6,553,141 B1 | 4/2003 | Huffman | |
| 6,700,589 B1 | 3/2004 | Canelones | |
| 6,711,297 B1 | 3/2004 | Chang | |
| 6,925,298 B2 | 8/2005 | Ho | |
| 7,489,825 B2 * | 2/2009 | Sirohey et al. | 382/244 |

(Continued)

FOREIGN PATENT DOCUMENTS

| | | |
|---|---|---|
| EP | 0982668 A2 | 3/2000 |
| WO | 0175776 A1 | 10/2001 |

OTHER PUBLICATIONS

Digital Imaging and Communications in Medicine (DICOM) Supplement 145: Whole Slide Microscopic Image IOD and SOP Classes Version: Final Text Aug. 24, 2010.

*Primary Examiner* — Matthew Bella
*Assistant Examiner* — Jason Heidemann (57) ABSTRACT

The invention pertains to the field of image processing in digital pathology. It notably proposes a method for processing a first digital image, representing a sample in a region, and which image has been acquired from the sample by means of a microscopic imaging system (1) and is stored in a multi-resolution image data structure (80), comprising the steps of:—retrieving (104) a sub-region of the first digital image at a first resolution, —executing (105) a transform function on the retrieved sub-region, the transform function modifying a content of the sub-region according to at least one metric derived from a second resolution representation of the first digital image.

21 Claims, 6 Drawing Sheets

(56) References Cited

U.S. PATENT DOCUMENTS

| | | |
|---|---|---|
| 7,684,647 B2 * | 3/2010 | Fu et al. .................. 382/294 |
| 2004/0141637 A1 | 7/2004 | Bacus |
| 2004/0203022 A1 * | 10/2004 | Herath et al. ............. 435/6 |
| 2006/0055693 A1 | 3/2006 | Sylthe |
| 2010/0121172 A1 | 5/2010 | Ladic |
| 2010/0141752 A1 * | 6/2010 | Yamada et al. ............ 348/79 |
| 2010/0246988 A1 * | 9/2010 | Dekel et al. .............. 382/255 |
| 2011/0181701 A1 * | 7/2011 | Varslot et al. ............. 348/46 |
| 2013/0038750 A1 * | 2/2013 | Dekel et al. .............. 348/222.1 |

* cited by examiner

IMAGE PROCESSING METHOD IN MICROSCOPY

FIELD

The invention relates to the field of digital pathology, in particular to technology for whole slide scanning.

In particular the invention relates to an image processing method that enhances/modifies a digital microscopy image.

BACKGROUND

Digital pathology provides new ways to visualize tissue slides and enables new workflows for analyzing these slides.

Figure 1:
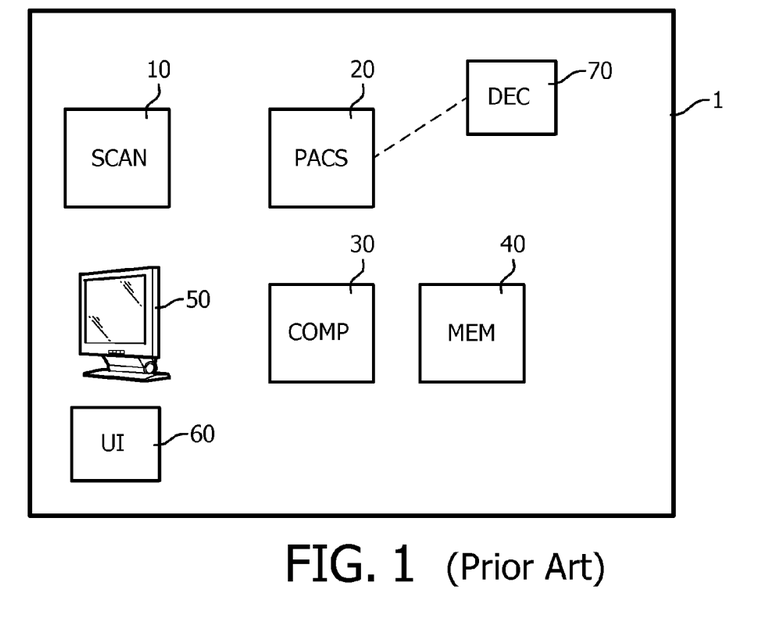
FIG. 1 schematically shows typical elements of a digital pathology system.

As illustrated in FIG. 1, a typical system 1 for digital pathology may notably comprise a scanner 10 for scanning a sample, for example a tissue sample and create a digital image thereof. Many types of scanner have already been proposed, such as 1D line scanner, 2D array scanner, so called Time Delay Integration (TDI) scanner, etc.

The system may further comprise a PACS 20 (Picture Archiving communication System) for archiving and communicating information such as a digital image of the tissue sample. The system may further comprise a computing device 30 for executing computer implemented instructions, and memory 40 such as buffer memory for loading such instructions and other binary information such as imagery data. The computing device may be a processor, FPGA (Fully Programmable Gate Array), DSP (Digital Signal Processor) and the memory can notably be a DRAM, SDRAM, SRAM, DDR SDRAM, FRAM, ROM, CD, DVD, depending on its intended function in the system and the desired performance.

As well known in the field of digital pathology, the computing device may generally be used for image processing, and image analysis for example for diagnosis. In the field of digital pathology, image processing generally refers to processing a digital image with an algorithm in order to modify the content of this image. Image processing thus notably comprises the functions of enhancing the perceived quality of the image, and registering the image in an image to a reference image. To the contrary, an image analysis algorithm (e.g. for diagnosis) will not modify the content of the digital image under study. In fact, this image may typically be one on which an image processing algorithm has already been applied. For information, a well-known example of an image analysis algorithm for diagnosis corresponds to a CAD algorithm (Computer Aided Diagnosis).

The present invention specifically pertains to the technical field in digital pathology of image processing as defined above. In other words, the present invention pertains to a method and software in digital pathology that prepare a digital image to be viewed and/or subsequently analyzed with an image analysis algorithm, like a CAD algorithm for example.

As mentioned before, an image processing algorithm may be configured to enhance the contrast of an image so that the operator can better find features of interest in the image displayed on a screen 50 of system 1. By way of example, the operator may first load an image for display on the screen showing a tissue sample stained with an H&E technique (Haematoxylin and Eosin). This image, which will be called herein after an HE image, may show the entire area of the sample that has been acquired with the scanner or a portion thereof. The operator may then select a region of interest, called herein after a sub-region, in this image in order to display a particular area of the sample at a higher resolution for example.

In this effect, system 1 may comprise an image processing algorithm which first transforms the entire area of the digital image, thereby creating a high resolution digital image of the entire area of the sample. Then, the further processing retrieves the imagery content in said sub-region from this high resolution image and the imagery content is displayed on the screen.

A problem however with such image processing algorithms is that, usually in digital pathology, the size of digital images are far bigger than that of digital images taken from other usual medical imaging instruments such as ultrasound, MRI, CT, PET, or X-ray.

As a consequence, in digital pathology, the large size of the digital images often require much more intensive computation and often lead to a low rendering performance notably in terms of display speed.

To solve such a problem, it has been proposed to optimize the hardware architectures of the computing devices by using for example dedicated graphics processing units (GPU) or parallel architectures. It has also been proposed to optimize the image processing algorithms. However, it is still difficult to achieve good performance with reasonable optimizations. Among others, such solutions again require a large amount of storage space and large bandwidth consumption notably between the storage in PACS and the computation device.

A different solution to the above mentioned problem has been proposed by down sampling (decreasing the resolution) the digital image representing the entire area of the sample and applying the transformation (e.g. enhancing the contrast) to this new image. When the user then selects the sub-region, the system retrieves the content of this region in the down sampled image. Even though this solution may provide real time performance, the down sampled image displayed to the pathologist may not have sufficient quality.

As mentioned before, image processing also refers to image registration and here again the above-described problems may occur.

As another typical example, a pathologist may desire to view an HE image and indicate relevant sub-regions (e.g. a tumour area). She may then desire to order at least one additional slide prepared with a different staining technique for further analysis, for example an immunohistochemistry (IHC) technique. The additional slide may be imaged with a scanner to generate an IHC digital image. The pathologist may then desire to view the HE and IHC images side by side on the screen.

However, due to the nature of the slide preparation and due to the digitization process, the tissue and its features may not have the exact same shape, appearance or spatial alignment, making it difficult to find the same region on different slides of adjacent tissue.

To make this possible, an image registration may be needed. It should be noted here that image registration designates herein a process of computing a spatial transformation that maps point from one image to homologous points in another image.

Image registration techniques are known in digital pathology and are usually based on applying such a transformation on each acquired digital image of the sample.

However, it may be reminded that digital microscopy images are usually different than digital radiology images. The size of the digital microscopy images is one of the differences that has been described before.

As another difference, radiology images with the exception of magnetic resonance (MR) images, tend to generate absolute pixel intensities (for example general X-ray and CT images use the Hounsfield unit where air is −1000, water is 0, and bone >400). Similar to MR, the pixel intensity distribution of digital microscopy images depends on a large variety of factors, which are often difficult to control and possibly not uniform for the entirety of the image or between scans. Such factors include tissue movement during microtoming, non-standardized staining procedures, and auto-focus and other image processing algorithms used during acquisition.

As another difference, the acquisition of multi-modal images within radiology typically involves imaging the same region (for example CT-PET acquisition captures the same anatomic region at the same time). Digital microscopy imaging generates multiple modes or representations by applying different staining procedures—such as immunohistochemistry or in-situ hybridization (ISH)—on adjacent tissue cross-sections. This form of acquisition is most similar (though still different) to intra-patient registration of radiology images.

The three differences explained above (i.e. extreme image size, non-absolute pixel intensity distribution, and multi-modal acquisition of adjacent tissue cross-sections) means that registration of digital microscopy images, in particular of multi-modal images, for whole slide microscopy is not trivial and again requires intensive computation which limits the performance of the digital pathology systems in terms of speed.

Again, even though the two solutions described above (hardware or image processing algorithm optimization, and down sampling the whole slide image) may be used to improve the performance of the digital pathology system, this may be not be sufficient.

Therefore, the invention desires to solve the above-mentioned problems.

SUMMARY OF THE INVENTION

In particular, there may be a need of a digital pathology system with improved image processing performance and preferably real-time performance Further, there may be a need of such a digital pathology system with improved image registration performance. Such system may notably be able to provide improved multi-modal image registration so that when a pathologist selects a sub-region in an image (for example an HE image) the system automatically displays the corresponding sub-region in another image of the sample, for example an IHC image, with real-time performance.

In this effect, according to the invention it is proposed a method for processing a first digital image, representing a sample in a region, and which image has been acquired from the sample by means of a microscopy imaging system, comprising the steps of:
retrieving a sub-region of the first digital image,
executing a transform function on the retrieved sub-region, the transform function being adapted to modify a content of the first digital image.

It is further proposed a computer program product for processing a first digital image, representing a sample in a region, and which image has been acquired from the sample by means of a microscopic imaging system, the computer program product comprising the following instructions:
retrieving a sub-region of the first digital image,
executing a transform function on the retrieved sub-region, the transform function modifying a content of the sub-region according to at least one metric derived from a second resolution representation of the first digital image.

It is further proposed a digital pathology system comprising a computer program product as defined above.

Thus, rather than applying a transformation on a digital microscopy image representing the scanned area of the sample, in the invention the transformation is only applied to a high resolution sub-region of this image. In other words, the transformation is performed on-demand, only on high resolution sub-regions, thereby saving significant computations in image processing, significant storage space in e.g. buffer memory and significant bandwidth costs.

Moreover, another advantage may be that the specific transformation may be chosen late in the workflow, for example by the user just prior to display or analysis.

According to an embodiment, the transform function is adapted to enhance the perceived quality of the image in the sub-region that has been selected. For example, the user may select a sub-region in the digital image, may select a contrast enhancement function through a user interface 60, the system than may retrieve the sub-region at high resolution (its pixel content typically) from the digital image, apply the contrast enhancement function on the sub-region and display such new high quality image on the screen. Therefore, thanks to this very efficient processing technique the sub-region may be displayed in real-time with a better quality.

Other transform functions may be used such as Applying a LUT function (Look Up Table), segmentation method, format conversion (e.g. Convert from RGB color space to HSV color space), etc.

According to a further embodiment, a second digital image which has been acquired from said sample by means of a microscopy imaging system is provided. Metrics derived from this image and from the first digital image is used to compute the transform function.

It should be noted that "same sample" may designate a same biological specimen that is obtained from for example a same block of paraffin. In other words, two same samples may include substantially same features and same topologies. Further, the microscopic imaging system may be the same or may be different than that used for obtaining the first digital image.

To avoid any doubt, it should further be noted that "metric" may define any function used to determine a suitable transform function for modifying a sub-region content. The metric may be used in an optimization process to determine the "optimal" transform function (where optimal is defined with respect to the metric function). As a non limitative example, in embodiments of the invention wherein the transform function performs a general transformation, some metrics may include: image contrast, histogram distribution of neighbouring regions, edge strength, or focus estimation. Further, in embodiments of the invention wherein the transform function performs a spatial transformation, some metrics may include (non exhaustive list): sum of squared differences (also known as mean squared error), normalized cross correlation, mutual information, or optical flow, etc.

In one embodiment computing the transform function comprises computing a spatial transformation between the first and second digital images, preferably at a lower resolution than that of the sub-region on which the transform function is to be executed. Thus, the transform function notably enables a fast image registration so that sub-regions of the two images can later be both viewed with a good spatial coherency and in real time. By way of example, the pathologist may desire to compare a region of interest in the sample between an HE image and an IHC image. He may therefore select a sub-region in the second digital image currently viewed on the screen (e.g. the HE image). The system may compute the spatial transformation needed to match the two low resolution digital images, retrieve a sub-region in the IHC image corresponding to that selected in the HE image (the IHC image being preferably at higher resolution than that use for the transformation computation), apply the spatial transformation to the retrieved sub-region from the IHC image and display this sub-region with the corresponding one in the HE image (the selected one at the higher resolution chosen for the first sub-region). In an embodiment, the second digital image is prepared with an H&E staining technique and defines a reference image.

In an embodiment, the first digital image is prepared with an IHC staining technique.

In a preferred embodiment, the second digital image is prepared with an H&E staining technique and the first digital image is prepared with an IHC staining technique. This allows the operator to visualize and analyze the corresponding sub-regions from two images with different staining techniques. Said staining techniques provide complementary information, emphasising different structural and/or functional information.

In other embodiments, the staining technique used for the first and second image is the same, for example two images of a sample stained with IHC or H&E.

In an embodiment, determining a spatial transformation comprises the step of spatially aligning the first digital image with respect to the second digital image. When this embodiment is combined with the two preceding ones, this provides a means to visualize the corresponding sub-regions of different staining techniques with complementary information.

In a further embodiment, the pathologist or the system selects a sub-region in the second digital image, this sub-region having a contour, and, before the step of retrieving a sub-region of the first digital image, the method comprises the additional steps of executing the transform function on said contour to obtain a transformed contour which defines a contour of the sub-region of the first digital image. As a non limitative example, when an HE image of the whole sample area or portion thereof is displayed on the screen, she may select a sub-region to look at a particular area of this sample. The system computes the spatial transformation between the HE image and an IHC image, applies first the transformation to the contour of the selected sub-region thereby obtaining a transformed contour. This transformed contour defines a corresponding sub-region in the IHC image. The content of this sub-region is then retrieved from the IHC image, the transformed function is executed on this content which is then displayed, for example side by side with the corresponding sub-region of the HE image.

In an embodiment, a first and a second area in the first and in the second digital images respectively are selected by either the pathologist or automatically by the system. Both areas are bigger than the total area represented by the first sub-region. The spatial transformation, and in particular the spatial alignment of the first digital image with respect to the second digital image, is then based on a comparison of the imagery contents in said first and second areas. This allows global information from the entirety of the digital images (or part thereof) to be employed when computing the spatial transform. Global information is important because said sub-regions may not contain sufficient overlapping content to compute the transform.

In an embodiment, the first and second areas are substantially equal to the total area represented by the second digital image. For example, image registration is performed on the basis on the whole scanned area of the sample. And more preferably said first and second areas overlap the first sub-region. This allows global information from the whole scanned area of the sample to be employed when computing the spatial transformation.

In a further embodiment, each digital image is provided from a multi-resolution image data structure. In the step of computing a transform function, any digital image used therein is obtained from a low resolution level in the image data structure. And in a step of retrieving a sub-region from an image, this image is preferably obtained from a higher resolution level in the image data structure. This provides for further improvement of the image registration efficiency, notably because it is substantially faster to compute the spatial transformation on a lower resolution image (e.g. the low resolution image has smaller image dimensions than the high resolution image). Moreover, as can be understood from before, computing the spatial transformation on the low resolution image, but applying it on the high resolution image, produces high quality output images with smaller computational overhead.

In a further embodiment, the transform function is adapted to highlight in the sub-region a difference between the first and the second digital images. This allows to determine any mismatch between the first and second images to be displayed or further analyzed.

In a further embodiment, the second image may be either directly obtained from a library of images or generated from a library of images. The transform function may then be computed based on the retrieved or generated second image from the library. Such usage may include, but is not limited to, using the pixel data of the retrieved second image to compute the transform function. Another usage may include using metadata (textual or other information) of the retrieved second image to compute the transform function. In the generation case, the second image may be generated from a library by, for example, computing the average of images meeting some search criteria.

These and other aspects of the invention will be apparent from and elucidated with reference to the preferred embodiments described hereafter.

DETAILED DESCRIPTION OF PREFERRED EMBODIMENTS

Preliminarily it should be understood that the term "content", when referring to an image, indicates any kind of information that can be derived in this image. Such information may typically correspond to certain biological features present in the sample and may typically correspond to information derived from pixel data.

The terms "transform", "transform function, "transformation" shall have the same definition.

The term "area" may preferably refer to a physical portion of the sample under investigation, while the term "region" or "sub-region" may preferably refer to a portion of the image in the digital world.

The term "sub-region" shall define a portion of a "region".

Further, "providing an image" shall encompass various possibilities known in the art such as receiving the image from a scanner, from a storage memory, from a telecommunication link like an intranet network or like internet, from a data structure as described herein after, etc.

According to the invention, the term scanner shall refer to any scanning imaging device used in microscopy, and notably those mentioned in the introductory part above.

A digital pathology system according to the invention notably comprises the elements basically described with reference to FIG. 1.

According to a preferred embodiment of the invention, the PACS system 20 comprises a multi-resolution image data structure. Such data structures are well known in the art are notably defined by the DICOM standard. A description of such a data structure can also be found in DICOM Supplement 145: Whole Slide Microscopic Image IOD and SOP Classes [1]. They can be represented as shown for example in FIG. 2. As can be seen, the data structure 80 in this example can be represented by a pyramidal shape. Each height in the pyramid corresponds to a specific image level of resolution of a same sample. The highest resolution level is at the base of the pyramid, whereas the lowest resolution is as the tip of the pyramid and could typically corresponds to thumbnail image of the sample. Preferably the highest resolution image is acquired with the scanner, and at lower levels each image can either be acquired with a scanner or derived from the highest resolution image according to well known algorithm in the art such as by applying wavelets transforms (see notably U.S. Pat. Nos. 6,711,297, 6,553,141 or 6,925,298). Advantageously such a wavelet storage format can be easily implemented without requiring extra storage space and/or bandwidth.

Figure 2:
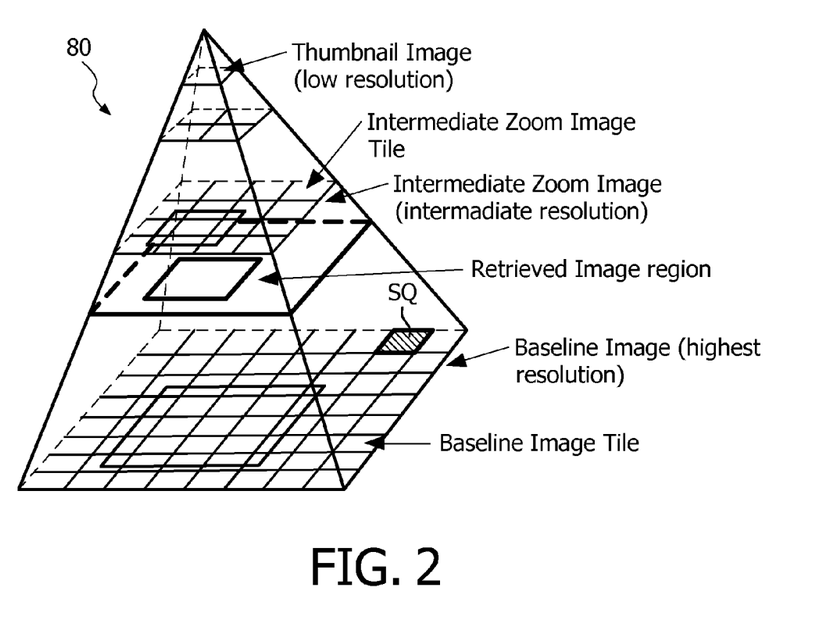
FIG. 2 shows a schematic illustration of a multi-resolution image data structure.

Also, as is well known in the field of digital pathology, any level in such a data structure can be composed of different tiles of images (represented by a square, like square SQ for example).

The data structure can either be stored locally or accessed on a remote server.

In this effect the system of the invention comprises a decoder 70 which provides such random access to any desired sub-region at any desired image resolution level in such a data structure.

Figure 3:
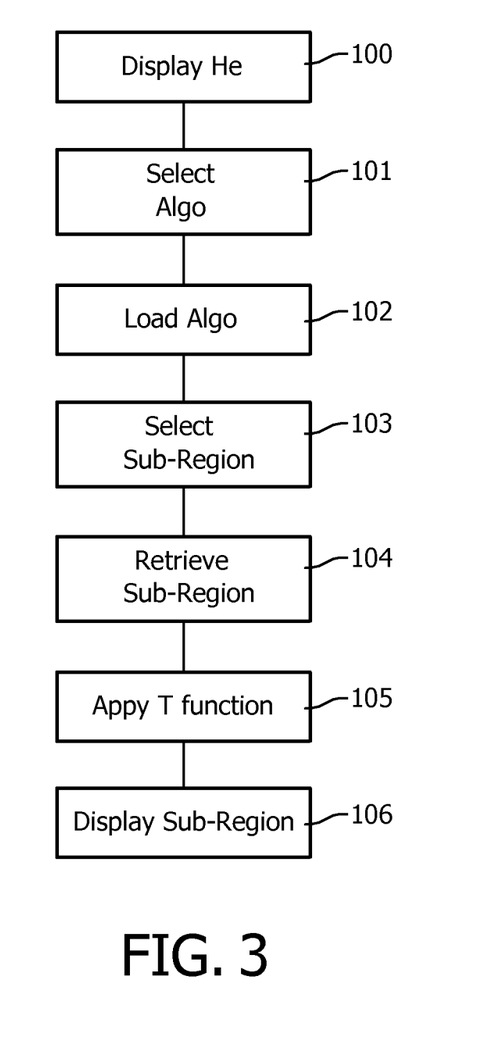
FIG. 3 shows an illustrative example of a method according to an embodiment of the invention.

A flow chart of a method according to a preferred embodiment of the invention is now illustrated in FIG. 3. A skilled person in the art will recognize that the described order of these steps as well as any other steps of the method of the invention described herein is not mandatory and that many appropriate adaptations can be carried out.

At step 100 a first digital image is displayed on the screen 50, for example an image showing a sample or portion thereof that has been stained with an H&E staining technique (this image is called HE image herein after).

The pathologist may be able to select a transform function such as an image contrast enhancement function via the user interface 60.

By selecting this function at step 101, the system loads in memory—typically a buffer memory—the computer instructions of this transform function (step 102). These instructions may be stored on a local storage memory or in a remote location, for example a remote server.

The pathologist may also be able to select an area of interest in the sample by selecting at step 103 a sub-region in the HE image. He typically may use a pointing device such as a mouse and drag an image selection on the screen to define the sub-region.

At step 104, the decoder 70 localizes the sub-region in the data structure of the HE image, preferably at a high resolution sufficient for the pathologist to view all the details he is looking for. The content of the sub-region is retrieved from the decoder and is loaded into memory (e.g. memory 40), typically a buffer memory. The content is typically pixel data.

At step 105, the computing device 30 executes the instructions of the selected transform function on the retrieved sub-region, thereby enhancing the contrast of this sub-region.

At step 106, the initial display of the HE image is replaced by the display of the enhanced sub-region.

Of course, other display options may be possible. As a non limitative example the display of the HE image may be kept but with a smaller area on the screen and the sub-region may be displayed in a bigger area of the screen near the HE image. The pathologist may thus be able to keep an overall view of the sample while looking at details in the sub-region.

While in the embodiment described above the transform function may correspond to an algorithm known in the art for image quality enhancement such as contrast enhancement, the transfer function may also be determined on the basis of another digital image. For example, the other digital image may define the quality performance that is to be achieved. For example, the other image may be an HE image, and may define the contrast level that is to be achieved for the first HE digital image.

According to another preferred embodiment of the invention, the transform function is derived from two different digital images.

In an exemplary embodiment, the transform is configured to apply a spatial transformation on a digital image. More precisely, we will see herein after that the following transformations and combination thereof may be used:

Rigid transforms may consist of translation, rotation, scaling, shear, or any desired combination of these such as for example similarity (translation+rotation+scaling) and affine (translation+rotation+scaling+shear).

Non-rigid transforms, also known as deformable transformations, are comprised of a global rigid (translation+rotation) component plus local displacements or perturbations. There are a number of possible ways to represent such a transformation including: B-splines, thin-plate splines, elastic models (such as finite element models), and optical flow methods.

Such transform functions can advantageously be used for an efficient image registration as mentioned above, a non limitative exemplary embodiment of which will be described in detail herein after.

This embodiment notably allows for the visualization of whole slide images with different staining techniques, such as H&E and IHC. Further, this embodiment allows for comparing a fixed image (e.g. the HE image) on the screen with several other images of the same sample that have been acquired in time and thus moving, typically (e.g. IHC images).

Unlike previous computationally intensive approaches which apply an alignment transformation to the entire whole slide image, this embodiment is based on a two-step strategy with the aim of meeting computation and time constraints without sacrificing quality.

In the first step, the spatial transformation is determined. More precisely, an entire HE image and at least one entire IHC image, preferably both at low resolution, may be retrieved and loaded 200 in buffer memory from accessing two data structures stored in the PACS. The spatial transformation notably allowing a spatial matching of substantially all the points in the HE image and of the homologous points in the IHC image is determined 201 in the system. The transformation also notably allows for spatial alignment between the two images. In this preferred embodiment, the entire content of the HE and IHC images is compared. Further, the HE image defines the reference image with respect to which other images such as the IHC images should be spatially aligned.

The transform function can then be stored in memory for later use or kept in buffer memory if the step is performed right after.

Figure 4:
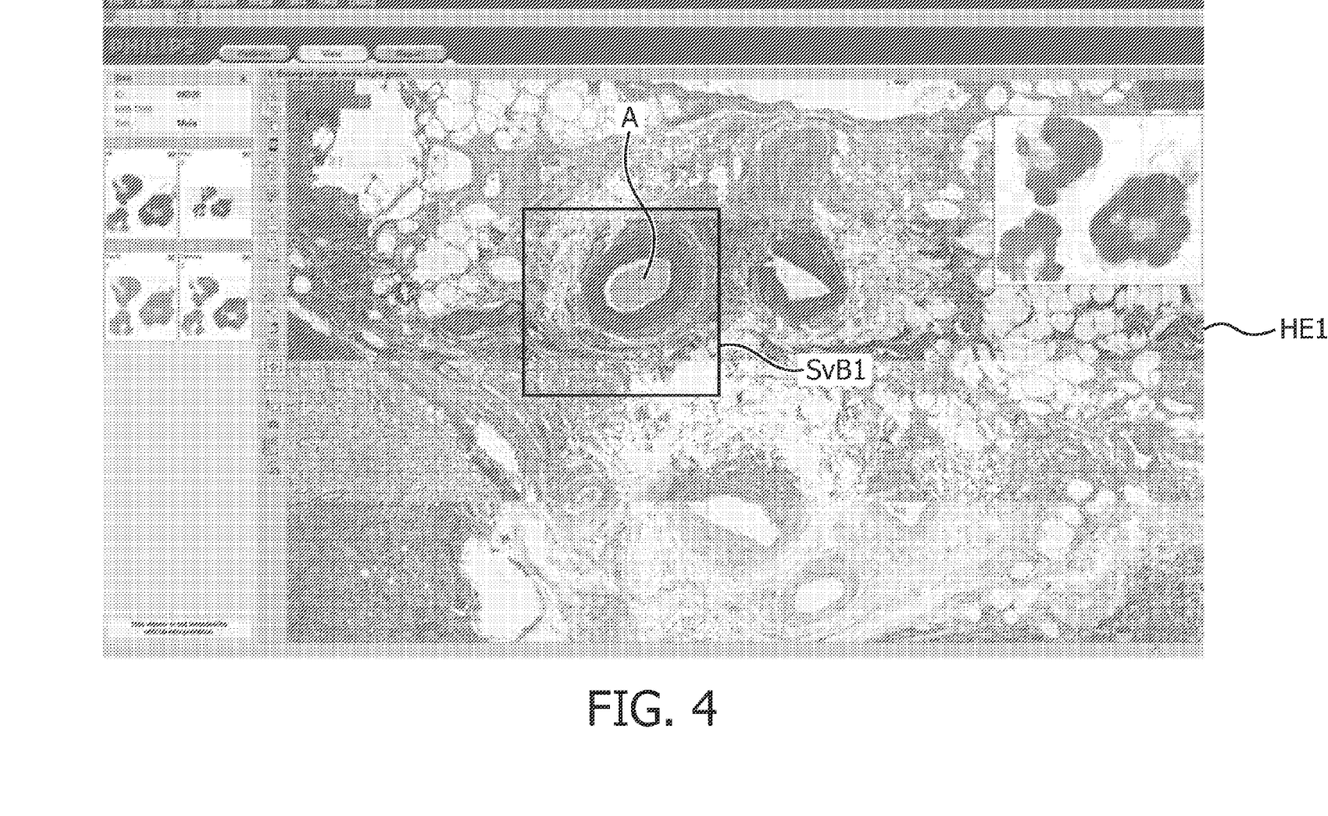
FIG. 4 show a display of a digital image in which a sub-region is selected by defining a contour.
Figure 5:
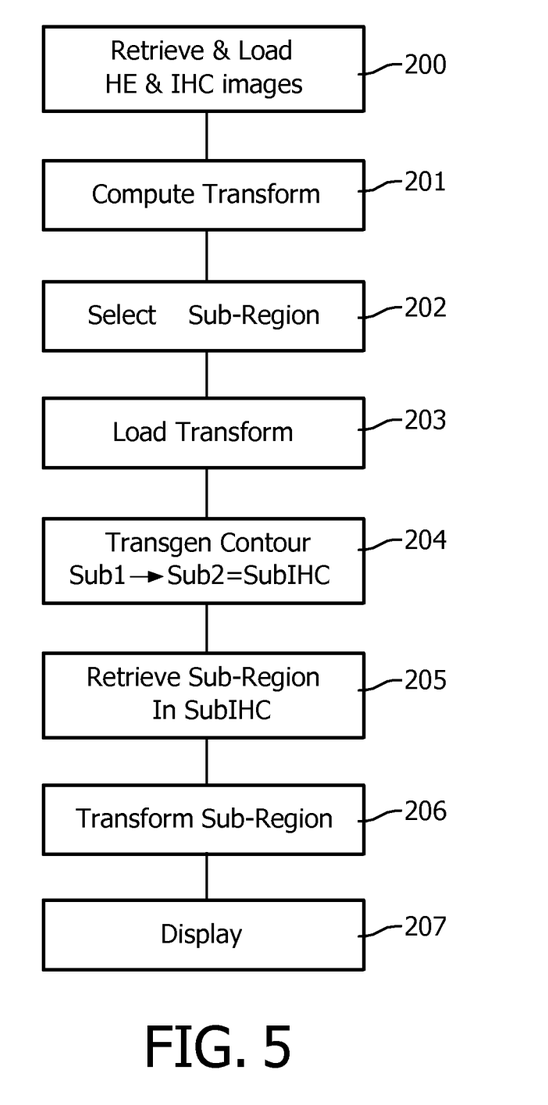
FIG. 5 shows an illustrative example of a method according to another embodiment of the invention.

In the second step of the exemplary embodiment, with reference to FIGS. 4 and 5 a sub-region in the HE image HE1 may be selected in step 202, thereby defining a contour like contour SUB1 around feature A shown for example in FIG. 4. As mentioned above this selection may be made by the pathologist himself with the pointing device or by the system which for example is able to automatically identifies regions of interest in the sample to be viewed or analyzed.

In step 203, the spatial transformation computed in the first step of the strategy may be loaded in a buffer memory if necessary, and executed on the contour SUB1 at step 204 to create a transformed contour SUB2. This transformed contour SUB2 now defines a contour SUBIHC of the sub-region of the IHC digital image which is going to be displayed and viewed by the pathologist on the screen.

In step 205, the sub-region (typically the pixel data) enclosed in the transformed contour is retrieved from the IHC image data structure. Preferably the IHC image in the data structure used for retrieving this sub-region is at a higher resolution than that of the entire images retrieved for computing the transform function in step 1.

In step 206 the same spatial transformation is executed on the retrieved IHC sub-region.

Finally, in step 207 the sub-region of the HE image and the sub-region of the IHC image so computed are displayed together on the screen for example side by side for easy comparisons.

Figure 6A:
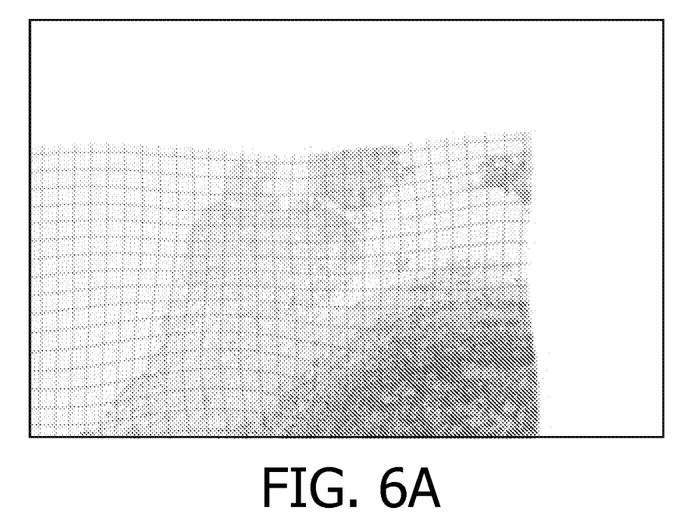
FIG. 6 shows a result comparison from using two processing methods on a same digital image.
Figure 6B:
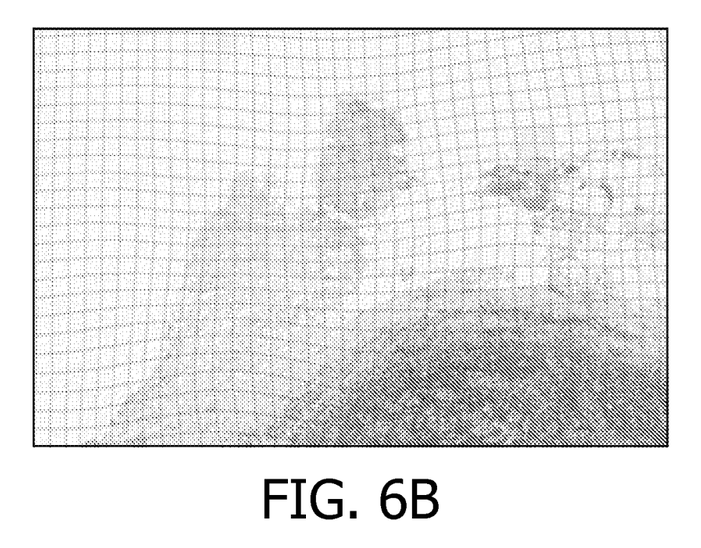

FIG. 6B shows the result of the image processing method according to this embodiment compared to a method where steps 204 to 206 are replaced by a single step of transforming directly the sub-region that has been selected in step 202 (FIG. 6A). As can be seen, the embodiment of the invention provides, notably, much better visually appealing results.

As already mentioned the second step of the strategy is performed on line and allows for real time operations. In particular, this embodiment makes it possible to display two registered IHC and HE images or one HE image and several IHC moving images in real time after the pathologist selects the sub-region in the HE image.

Of course a skilled person in the art will be able to derive obvious alternatives to this preferred embodiment. In particular, instead of carrying out the selection of the sub-region in the HE image, it may be made in at least one of the IHC images, this image being then defined as the reference image.

A more detailed implementation of the embodiment using spatial transformation will now be described.

Herein after the term viewport will designate the region of an image currently viewed on an image renderer of the system.

1. First Step: Registration

The registration phase is responsible for computing a transformation which brings a number of moving images (first digital images in the meaning of the invention) into spatial alignment with a fixed reference image (second digital image in the meaning of the invention).

Due to the large size of digital microscopy images that has already been discussed before, this step of the process is preferably performed on low resolution images.

The registration may be formulated as an optimization problem in which a cost function C is minimized with respect to a parametric coordinate transform T(x). The optimization problem can be expressed as follows:

$$\mu' = \mathrm{argmax}_{\mu} C(T_\mu; I_F, I_M)$$

where the subscript indicates the transform parameters, IF is the fixed reference image, and IM is the moving image to which the transformation is applied. An iterative optimization scheme is employed to solve the minimization problem expressed in the above equation.

Figure 7:
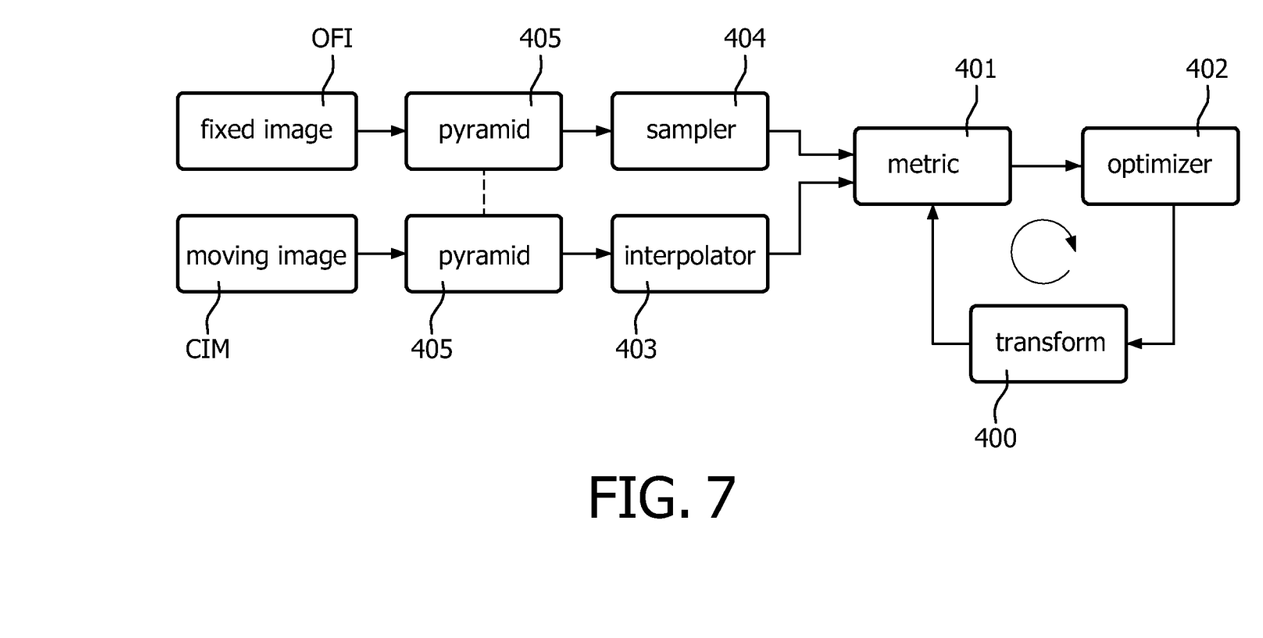
FIG. 7 illustrates components of registration framework used in embodiments of the inventions.

FIG. 7 depicts components of the registration framework. Any fixed image and moving image are provided by components CFI and CFM respectively. As can be seen the iterative optimization loop involves a spatial transformation 400, a metric 401 to evaluate the similarity of the fixed and transformed moving image, and an optimizer 402 which adjusts the transform parameters to minimize the current metric value. Also shown is an interpolator 403 responsible for re-sampling the moving image (the first digital image) using the current transform, and a sampler 404 for obtaining (typically random) pixel samples for the metric calculation. The entire optimization process is repeated for different resolution levels computed by the pyramid components 405. Transform parameters are propagated from the previous resolution level resulting in an iterative coarse-to-fine process.

There are a number of different options for each component in the aforementioned registration framework. There are several choices for the similarity measure including: Sum of Squared Differences (SSD), Normalized Correlation Coefficient (NCC), Mutual Information (MI), and Kappa Statistic (KS). SSD and NCC are suited for images with equal or similar pixel intensities (i.e. the same modality). In contrast, MI only assumes a statistical relation between the pixel intensities and is therefore suited for multi-modality images. KS can be used to register binary images.

The registration framework may also implement a number of transform functions, each with varying degrees of freedom (dimension of $\mu$ (mu)). The following is a non limitative list of possible transform functions with the degrees of freedom indicated in brackets: translation (2), rotation (2), rigid (translation and rotation, 4), similarity (translation, rotation, and isotropic scaling, 5), affine (translation, rotation, scaling, and shear, 6), B-spline deformable (variable dimensionality depending on user-selected grid size). Various optimization methods are also possible, including: gradient descent, quasi-Newton, evolution strategy, and a number of stochastic gradient descent methods.

A case involving multi-modal analysis may typically include at least one H&E stained slide and one or more IHC stained slides. For example a breast biopsy may be stained with H&E and the following IHC stains: ER (estrogen receptor), PgR (progesterone receptor), HER2 (human epidermal growth factor receptor 2), and Ki-67. Because it is common to most pathology cases, H&E is chosen as the fixed image (the second digital image in the sense of this invention), with each IHC stained image spatially aligned to this single reference image. This choice means that the registration process needs only be applied once to each IHC image to allow both H&E-IHC and IHC-IHC analysis. For example: by registering H&E-ER and H&E-HER2, it is possible—with no extra computation—to view ER-HER2 aligned images.

Registration of multi-modal digital whole slide microscopy images may automatically exclude many of the similarity metrics mentioned above.

A preferred choice is mutual information (MI) which—due to its statistical nature—inherently supports images from different modalities. One possible implementation is to compute the MI metric on a single channel (e.g. the luminance) of the fixed and moving images, however the transform function is applied to the complete three-channel color image. Given the metric, the decision of which optimizer and sampler to use is much easier. Mutual information is known to produce good results when using randomly chosen samples, and when using a computationally efficient stochastic gradient descent method (stochastic gradient descent differs from deterministic methods in that the derivative of the cost function is approximated).

There may be different choices of spatial transform functions. For computational efficiency and speed, it may be desirable to only apply a translation to bring the fixed and moving images into spatial alignment. Such an operation requires a simple modification of the request for pixels visible in the viewport. However, due to the fact that tissue can easily undergo local deformation during the slide preparation process, a global translation transform may typically fail to bring the images into sufficient alignment. A global rigid transform, while an improvement, also may not have enough degrees of freedom to describe local deformations. A deformable transform on the other hand may have the required degrees of freedom to account for local perturbation, but is not guaranteed to have applied the correct inverse distortion to restore the tissue. Moreover, each of these types of transforms has different computational complexity.

2. Second step: Online Transformation

As already said, due to the size of digital whole slide images (in the order of 15-30 GB), it may be difficult to load the entire image into memory for viewing. As such, a pyramid-like tile-based data structure as described before notably with reference to FIG. 2 may advantageously be employed to allow random access to a specific region for a given resolution level. Not only may these extreme sizes be problematic for viewing, but also when considering image processing and registration methods. Of course, as said, one possibility could be to apply the registration transform to the entire digital image. While this is technically very simple, it comes with unnecessary computational overhead: in most cases a clinical pathologist will review only a few regions at a high power field (e.g. zoom factor of 20× or 40×). Applying the transform to the whole image when only a fraction of this image will be viewed may be inefficient. Furthermore, processing this whole slide image means the user can not choose at run-time which type of transform function should be applied (global rigid, deformable, local translation, etc.).

To avoid such issues, the transforms computed in the previous step are applied only to the currently visible region, i.e. the viewport or said differently the sub-region.

Now, the viewer for display could be implemented such that the selected transform is simply applied to the pixels in the viewport. The steps would then typically be as follows: (1) the viewport would be selected by the pathologist, (2) pixels in the viewport would be obtained from the pyramidal data structure, (3) the requested pixels would be transformed, (4) the transformed pixels would be displayed.

Unfortunately, by doing so, large spatial transform functions would move the requested pixels outside of the viewport as shown in FIG. 6. This issue would be most evident at higher resolutions (e.g. 20×, 40×) because the effect of the transform is also magnified. Therefore, instead, the process according to the preferred embodiment of the invention described above is used again.

(1) the viewport is selected by the pathologist,
(2) the viewport is modified by the spatial transformation,
(3) pixels in the modified region are obtained from the data structure,
(4) the requested pixels are transformed,
(5) the transformed pixels are displayed.

The modification of the requested sub-region may be slightly different for each transform type. In the case of the identity transform, the requested sub-region region is not modified. The translation transform simply requires each corner of the sub-region to be offset by the translation vector. In the rigid case, each corner point of the sub-region is transformed (translated, rotated) and the requested region set to the bounding box of the transformed points. Similarly, for the case of the deformable transform, a number of equally spaced points lying on the sub-region are transformed and the requested sub-region set to a contour defined by the transformed points. Unlike the rigid case, the corner points may not suffice for the deformable transform because the deformable field is not uniform for the entire sub-region. It was empirically found that eight to sixteen points are sufficient.

At this point it is interesting to describe a novel combination of the deformable transform and the viewport modification. In the case of the global rigid and deformable transform functions, the pixels requested after the viewport modification must undergo some sort of interpolation (linear, bi-cubic, etc.). This interpolation, while possible to implement at real-time frame rates, still consumes computing resources. Furthermore, if seen as a low pass filter, such interpolation ultimately introduces a degree of smoothing to the source data. In contrast, a simple translation avoids both these issues—the requested sub-region is modified to account for the translation avoiding both computation and the smoothing effect of interpolation. However, as previously mentioned, translation is far from adequate to account for local tissue deformation.

Instead of computing and applying the translation for the whole slide image (i.e. global), it is possible to use the deformation transform to extract a localized translation for the current viewport. This "local translation" may then be computed as follows:

(1) the viewport is selected by the user,
(2) the viewport is modified by the deformable transformation as described above,
(3) a region the same size as the original viewport is centered within the modified viewport,
(4) pixels in the centered region are obtained from the data structure,
(5) requested pixels are displayed.

One obvious deficiency is that the transform does not account for local rotation, meaning the slide images need (rough) angular correspondence. Another issue is that for low zoom factors (e.g. when the whole slide image is fit to the viewport) the transformation reduces to global translation.

However, for high zoom factors (e.g. 40×) the transformation should approximate the deformable transform (without the rotation component or highly localized perturbations).

As proposed before, the registration phase may consist of two sub-steps: the first sub-step computes a rigid transform, the second sub-step uses the rigid result as initialization for computing a non-rigid (deformable) transform. Each sub-step may be computed across multiple resolutions levels, with the result from the previous level used as initialization for the current level. It is possible to vary the "final" level on which to compute the registration. Note that level zero refers to the base level of the image pyramid (e.g. the natively scanned 20× image). For example, a final level of six implies the following (assuming three resolution levels): (1) compute rigid transform at level eight, (2) use result to refine rigid transform at level seven, (3) use result to refine rigid transform at level six, (4) use rigid transform from level six to compute deformable transform at level eight, (5) use result to refine deformable transform at level seven, (6) use result to refine the final deformable transform at level six.

Experiments seem to indicate that, especially in the case of the deformable transform, high resolution levels (e.g. four and five) have less registration error (and less deviation) than low resolution levels (e.g. six and seven). Also it seems that the registration process is faster for low resolutions (e.g. levels six and seven) than for high resolutions (e.g. levels four and five). Therefore it appears using a final level of five or six provides a good trade-off between quality and speed. Recall that it is difficult to choose the most suitable transform for registering whole digital microscopy images. A global translation is fast, but fails to account for rotation or local deformation. A global rigid transform accounts for rotation, but not local deformation. A non-rigid (deformable) transform handles local perturbation at the cost of a large number of parameters (i.e. speed). Finally, the local translation transform is fast and retains the original image quality, but does not fully account for tissue deformation.

Experiments seem to indicate that a deformable transformation is the slowest, where as local translation performs nearly as fast as no transformation (identity). Further experiments suggest that for all zoom factors the deformable transform is better than the rigid transform, which in turn is better than identity. The local translation approach on the other hand is similar to the identity transform at low zoom factors, similar to the rigid transform at intermediate zoom factors, and approaches the same quality as the deformable transform at high zoom factors.

To summarize, the global rigid transform provides medium performance and quality. The deformable transform provides the best quality and is constant across all zoom factors; however, it is the slowest (both the initial computation, and when transforming pixels in the viewport). While the deformable transform attempts to bring tissue structures and cells into exact alignment, it also requires interpolation which can be seen to have a slight negative impact on image quality due to smoothing. The local translation transform has the best performance, though it takes the same time as the deformable transform for the initial offline computation. Because it does not require interpolation, it provides good image quality and overlap at high zoom factors, but reduces to global translation at low zoom factors.

It is explicitly intended that the teaching of this invention covers any combination of the above described embodiments or modifications.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims.

For example, this invention encompasses embodiments wherein the large digital images can be stored on a server, a client provides an interactive view of at least one of the large images, and only a sub-region of this entire digital image is shown. The transform function is applied to this sub-region by the client just prior to displaying it on the screen.

As another example, the transform function may be obtained directly from a scanner or communicated to the system from a remote location where it is stored.

Also, while IHC and H&E staining techniques have been described above, the invention encompasses embodiments using other well-known techniques such as fluoroscopy (for example Fluorescent In Situ Hybridization). Besides any combination of two of these staining techniques can be considered when implementing the invention with the first and second images, e.g. HE image with IHC image, or IHC image with IHC image, or HE image with Fluorscopic image, etc.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

[1] DICOM Standards Committee Working Group 26 (Pathology); Supplement 145: Whole Slide Microscopic Image IOD and SOP Classes; NEMA.

The invention claimed is:

1. A method for processing a first digital image, representing a sample in a region, which first digital image has been acquired from the sample by a microscopic imaging system and stored in a multi-resolution image data structure, the method comprising:
   computing a transform function according to at least one metric derived from a second digital image and a corresponding metric derived from the first image, the second digital image having a sub-region with a contour;
   retrieving a sub-region of the first digital image at a first resolution, the sub-region of the first digital image having a contour defined by the transformed contour of the sub-region of the second digital image; and
   executing the transform function on the retrieved sub-region of the first digital image, the transform function modifying a content of the selected sub-region of the first digital image according to at the least one metric derived from a second resolution representation of the first digital image.

2. The method according to claim 1, wherein the transform function includes a spatial transformation.

3. The method according to claim 1, wherein the first and second digital images represent the same sample, and wherein computing the transform function includes spatially aligning the first digital image with respect to the second digital image 4. The method according to claim 1, wherein the second digital images is also provided from a multi-resolution image data structure, and wherein in the step of computing the transform function the first and second digital images are at a low resolution, and the retrieved sub-region is at a high resolution.

5. The method according to claim 1, wherein the transform function is configured to highlight in the sub-region a difference between the first and the second digital images.

6. The method according to claim 1, wherein the first and second digital images have been acquired using a first and a second sample preparation technique respectively, these two techniques being different.

7. The method according to claim 6, wherein the sample of the second digital image is prepared with an hemotoxylin and eosin (H&E) staining technique.

8. The method according to claim 6, wherein the sample of the first digital image is prepared with an immunohistochemical (IHC) staining technique or a fluorescence staining technique.

9. The method according to claim 1, wherein the transform function is adapted to enhance the contrast of the sub-region.

10. A method for processing a first digital image, representing a sample in a region, and which image has been acquired from the sample by means of a microscopic imaging system and is stored in a multi-resolution image data structure, comprising the steps of:
    computing a transform function according to at least one metric derived from a second digital image, in addition to said metric derived from said first image;
    retrieving a sub-region of the first digital image at a first resolution;
    executing a transform function on the retrieved sub-region, the transform function modifying a content of the sub-region according to at least one metric derived from a second resolution representation of the first digital image;
    selecting a first area in the first digital image and a second area in the second digital image, respectively, both areas being bigger than the total area represented by the first sub-region; and
    aligning the first digital image with respect to the second digital image based on a comparison of contents in said first and second areas.

11. The method according to claim 10, wherein an area of said first and second areas are substantially equal to the total area represented by the second digital image.

12. The method according to claim 10, wherein said first and second areas overlap the first sub-region.

13. A method for processing a first digital image, representing a sample in a region, which first digital image has been acquired from the sample by a microscopic imaging system and stored in a multi-resolution image data storage structure, the method comprising:
    computing a transform function according to at least one metric derived from a second digital image and at least one metric derived from said first image;
    selecting a sub-region in the second digital image, the selected sub-region having a contour;
    executing the transform function on said contour to obtain a transformed contour;
    retrieving a sub-region of the first digital image at a first resolution, the sub-region of the first digital image having a contour defined by the transformed contour of the sub-region of the second digital image; and
    executing the transform function on the retrieved sub-region of the first digital image, the transform function modifying a content of the selected sub-region of the first digital image according to at least one metric derived from a second resolution representation of the first digital image.

14. A method for processing a first digital image, representing a sample in a region, which image has been acquired from the sample by a microscopic imaging system and stored in a multi-resolution image storage data structure, comprising:
    retrieving a sub-region of the first digital image at a first resolution;
    executing a transform function on the retrieved sub-region, the transform function modifying a content of the sub-region according to at least one metric derived from a second resolution representation of the first digital image;
    computing the transform function according to at least one metric derived from a second digital image, in addition to said metric derived from said first image; and
    selecting a first area and a second area in the first and in the second digital images respectively, both areas being bigger than the total area represented by the first sub-region; and
    aligning the first digital image with respect to the second digital image based on a comparison of contents in said first and second areas.

15. The method according to claim 14, wherein an area of said first and second areas are substantially equal to the total area represented by the second digital image.

16. The method according to claim 14, wherein said first and second areas overlap the first sub-region.

17. A non-transitory computer readable medium carrying instructions which control one or more processors to process a first digital image, representing a sample in a region, which image has been acquired from the sample by a microscopic imaging system, said instructions including:
    computing a transform function according to at least one metric derived from a second digital image;
    selecting a sub-region in the second digital image, the selected sub-region of the second digital image having a contour;
    executing the transform function on said contour to obtain a transformed contour;
    retrieving a sub-region of the first digital image the selected sub-region of the first digital image having a contour defined by the transformed contour of the selected sub-region of the second digital image; and
    executing the transform function on the retrieved sub-region of the first digital image, the transform function modifying a content of the selected sub-region of first digital image.

18. The non-transitory computer program product according to claim 17, further comprising the instructions of computing the transform function by:
    providing a second digital image which has been acquired from said sample by means of a microscopic imaging system,
    determining a spatial transformation between the first and second digital images.

19. A non-transitory computer program product for processing a first digital image, representing a sample in a region, and which image has been acquired from the sample by means of a microscopic imaging system, the non-transitory computer program product conveying the following computer implemented instructions:
    retrieving a sub-region of the first digital image;
    executing a transform function on the retrieved sub-region, the transform function being adapted to modify a content of the first digital image;
    computing the transform function according to at least one metric derived from a second digital image, in addition to said metric derived from said first image;

selecting a first area and a second area in the first digital image and in the second digital image, respectively, both areas being bigger than a total area represented by the first sub-region, and aligning the first digital image and the second digital image based on a comparison of contents in said first and second areas.

20. A digital image processing system for processing a first digital image representing a sample in a region, the system comprising:

a multi-resolution image data storage structure configured to store a first digital image; and one or more computer processors configured to perform the method according to claim 1.

21. A digital image processing system for processing a first digital image representing a sample in a region, the system comprising:

a multi-resolution image data storage structure configured to store a first digital image; and one or more computer processors configured to perform the method according to claim 14.

* * * * *